United States Patent [19]

Hekal et al.

[11] Patent Number: 4,478,860
[45] Date of Patent: Oct. 23, 1984

[54] PROCESS FOR IMPROVING THE ORGANOLEPTIC PROPERTIES OF CANNED GREEN VEGETABLES

[75] Inventors: Ihab M. Hekal; Paul M. Erlandson, both of Stamford, Conn.

[73] Assignee: The Continental Group, Inc., Stamford, Conn.

[21] Appl. No.: 293,575

[22] Filed: Aug. 17, 1981

Related U.S. Application Data

[63] Continuation-in-part of Ser. No. 185,034, Sep. 9, 1980, abandoned.

[51] Int. Cl.$^3$ .......................... A23B 7/06; A23B 7/14; A23L 3/00
[52] U.S. Cl. .................................... 426/267; 426/262; 426/270; 426/325; 426/398; 426/402; 426/407; 426/323
[58] Field of Search ............... 426/270, 267, 262, 131, 426/322, 323, 325, 324, 398, 402, 407

[56] References Cited

U.S. PATENT DOCUMENTS

| | | | |
|---|---|---|---|
| 1,666,551 | 4/1928 | Butler et al. | 426/270 |
| 1,908,795 | 5/1933 | Sharma | 426/270 |
| 2,018,682 | 10/1935 | McConkie | 426/131 |
| 2,133,117 | 10/1938 | Schroder | 426/270 |
| 2,186,003 | 1/1940 | Blair | 426/270 |
| 2,189,774 | 2/1940 | Blair | 426/270 |
| 2,305,643 | 12/1942 | Stevenson et al. | 426/407 |
| 2,390,468 | 12/1945 | Schroder et al. | 426/270 |
| 2,473,747 | 6/1949 | Gieseker | 426/270 |
| 2,589,037 | 3/1952 | Bendix et al. | 426/267 |
| 2,827,382 | 3/1958 | Malecki | 426/267 |
| 2,875,071 | 2/1959 | Malecki | 426/270 |
| 2,906,628 | 9/1959 | Malecki | 426/270 |
| 2,976,157 | 3/1961 | Malecki | 426/270 |
| 2,989,403 | 6/1961 | Malecki | 426/267 |
| 3,183,102 | 5/1965 | Malecki | 426/262 |
| 3,539,359 | 11/1970 | Murchison | 426/324 |
| 3,892,058 | 7/1975 | Komatsu et al. | 426/412 |
| 4,104,410 | 8/1978 | Malecki | 426/412 |

FOREIGN PATENT DOCUMENTS

113524  7/1941  Australia ............................ 426/324

Primary Examiner—Steven L. Weinstein
Attorney, Agent, or Firm—Paul Shapiro

[57] ABSTRACT

A process for improving the organoleptic properties of canned green vegetables wherein vegetables blanched with a highly alkaline solution are suspended in a brine having an alkalinity adjusted to between about 25 to about 75 milliequivalents of hydroxyl ion in a hermetically sealed container internally coated with an organic coating filled with an alkaline earth compound such as MgO, the vegetables being sterilized at 250°–300° F. to an $F_0$ value of at least 6 whereby the original color and flavor of the vegetables are retained.

13 Claims, No Drawings

PROCESS FOR IMPROVING THE ORGANOLEPTIC PROPERTIES OF CANNED GREEN VEGETABLES

This application is a continuation-in-part of my co-pending patent applicaton Ser. No. 185,034 filed Sept. 9, 1980 and now abandoned, for "Internal Coating for Containers Used in the Canning of Green Vegetables".

BACKGROUND OF THE INVENTION

1. Field of Invention

The present invention relates to a method of canning green vegetables which prevents to a large extent the loss of the green color as well as the natural flavor effected by heat sterilization during the canning process.

2. Prior Art

In the commercial canning of foods, the product is sealed into cans in an unsterilized condition and then heat sterilized in a retort or pressure cooker. It is characteristic of such canning procedure that considerable overcooking of the food takes place inasmuch as the sealed cans must be heated for a considerable period of time to completely kill spoilage microorganisms such as bacteria and spores present in the food.

Modern food processors use temperatures well above 212° F., e.g., 240° F., and long periods of heating (as high as an hour or more) to ensure adequate destruction of spoilage microorganisms. The United States National Association of Food Processors (NAFP) has developed shelf-stable sterility temperature/time parameters based on subjecting a canned food product to elevated temperatures for inverse periods of time calculated to adequately destroy spoilage microorganisms therein to a commercially acceptable and nutritionally safe sterilization level. These temperature/time parameters are identified by the term $F_o$ value (sterility value) which is basically a time equivalent calculated at 250° F. Particular $F_o$ values required to achieve commercially acceptable shelf-stable sterility are highly variable, depending upon type and size of container, type and size of food product, acidity of product, and the like. Reference is directed to the National Canners Association "Laboratory Manual for the Canning Industry", Second Edition, 1956 for further information on this matter and how $F_o$ values are derived by those skilled in the art.

The NAFP recommends that vegetables such as green peas be sterilized under conditions calculated to provide an $F_o$ value of at least 6. The higher the $F_o$ value, the greater the degree of sterility. The present practice in the green pea canning art is to heat the canned peas in a No. 2 or No. 10 can at 250° F. for 15-30 minutes to achieve an $F_o$ of 6 to 8. Green vegetables and particularly green peas undergo a substantial loss of organoleptic quality when sterilized under these sterilization conditions, i.e., serious impairment of the flavor and color of the product results, e.g., the sterilized green peas acquire a brownish color and a taste quite unnatural to cooked fresh peas.

To meet the problem of overcooking to effect sterilization, canning methods have been developed, e.g., U.S. Pat. No. 3,892,058, wherein the packaged food product is rapidly heated to a relatively high temperature and then rapidly cooled. This High Temperature-Short Time (HTST) procedure very markedly reduces cooking inasmuch as sterilization can be effected very rapidly. Thus, in cases where one hour of heating is required at 240° F., for example, to kill all spoilage microorganisms, the same result is accomplished in less than 5 minutes at 270° F.

Although HTST sterilization has the above-mentioned advantage, commercial usage of the technique has heretofore been limited largely to liquid products such as milk because of the uneven heat distribution believed to occur in solid and semi-solid foods.

The utilization of HTST sterilization for canned solid foods such as green vegetables would be particularly advantageous as it is essential that the contents of the can be thoroughly sterilized after sealing to ensure the destruction of spoilage microorganisms.

The impairment in the organoleptic qualities of canned green vegetables has been determined to be due to the development of acid caused by the hydrolytic and oxidative changes which accompany the sterilization of the green vegetables in commercial canning. Thus the normal pH value for the fluids expressed from raw peas is about 6.0 to 7.0 and in special cases may be as high as 6.9. The canned product resulting from the sterilization of canned peas is found to have a pH value ranging from 5.8 to 6.4 and most frequently from 6.1 to 6.2. This decrease in pH constitutes an increase in acidity which causes the destruction of the natural green pigment during processing and subsequent storage, i.e., the degradation of green colored chlorophyll to brown colored pheophytin and pyrole.

Attempts have been made to correct this acidity by the addition of a neutralizing agent to the brine in which the vegetable is packed. For example, it has long been known to the art, e.g., U.S. Pat. Nos. 2,473,747 and 2,989,403, that the color of green vegetables can be maintained during canning and sterilization if sufficient alkali is added to the brine to maintain a pH of 8.0-8.5. Such attempts by the prior art have not been totally successful as the neutralizing agent, having been added to the vegetable brine, prior to or at the time of canning, is substantially dissipated before the vegetables are completely cooked. Thereafter, during storage, as the organic constituents of the vegetables and the brine, e.g., sugars, are slowly oxidized by the air in the can headspace, ester and amino acid compounds present in the vegetables are hydrolyzed, organic acids form which lower the pH of the brine to values at which continued discoloration of the vegetables can occur.

As an alternative to incorporating a neutralizing agent in the brine, the art, e.g., U.S. Pat. No. 2,875,071 issued Feb. 24, 1959 to George J. Malecki, has suggested incorporating into the interior can coating, an innocuous alkaline compound which is soluble in the canning brine, the coating and the compound being of such a character that the alkaline compound will leach out of the coating into the brine over an extended time period to maintain the pH of the brine at an alkaline level, e.g., pH 8.0-8.5.

The art, e.g., U.S. Pat. No. 4,104,410, issued Aug. 1, 1978, also to George J. Malecki, further discloses that although the use of alkaline compounds such as $Mg(OH)_2$ and $Ca(OH)_2$ are effective for the retention of green color in canned peas, the pH and the intensity of the retained green color decreases gradually when canned vegetables are kept in storage, so that to achieve a satisfactory green color retention at the end of one year of storage, it is necessary to maintain the pH at such a high alkaline level that an ammoniacal (barnyard) flavor develops. The off-flavor is believed due to the hydrolysis of amides such as glutamine or aspargine and fat (lipids) present in pea tissue.

U.S. Pat. No. 4,104,410 discloses a canning method for green color retention in canned green vegetables without the use of chemical additives in the container coating or brine wherein the vegetables are maintained in an aerobic environment up to the time of sterilization, the conventional blanching operation being replaced by a relatively low temperature (e.g., 100° F.) washing step. Sterilization of the canned food product is accomplished using HTST conditions of 250° F. and preferably above 275° F. at time periods ranging from a minute or a few seconds at high temperatures, e.g., 275°–425° F. to 5 minutes at 260°–270° F.

SUMMARY OF THE INVENTION

It has now been found that by control of the pH of the brine and the conditions of HTST sterilization, the desirable condition of green peas and similar green vegetables regarding color and flavor can be maintained intact during sterilization and storage of these foodstuffs utilizing a food container having an internal coating applied thereto containing an alkaline compound reserve within the coating.

In accordance with the present invention, the natural green color and flavor of canned green vegetables such as peas, spinach, asparagus and the like, may be retained whereby the vegetable is packaged in a container wherein a wall of the container has been coated with an inert, water insoluble organic coating material having incorporated therein an alkaline earth metal material selected from dibasic alkaline earth metals and alkaline earth metal salts at a concentration level of greater than 20% by weight based on the weight of the coating. The vegetables are blanched in an alkaline solution having a pH of at least 11 prior to their being added to the container. The blanched vegetables are suspended in a brine having an alkalinity adjusted to between about 25 and about 75 milliequivalents of hydroxyl ion and thereafter the canned product is subjected to a temperature of between about 250°–300° F. to obtain a sterilized product having an $F_o$ value of at least 6 with the pH of the resultant sterilized vegetable brine being between about 7.6 and 8.5.

As will be hereinafter illustrated, the method of the present invention can be employed for the canning of green vegetables without any noticeable effect on the color and flavor of the vegetables even after extended periods of storage.

PREFERRED EMBODIMENTS

To prepare the coating for containers used for the canning method of the present invention, alkaline earth materials are generally suspended in a conventional inert, water insoluble can coating enamel and applied as such to the container or container end stock. Such enamel may be applied using conventional coating procedures such as roll coating, spraying, swabbing or dipping. The alkaline earth metal material when incorporated into the enamel which is applied as the usual internal can coating fulfills the requirement that there be sufficient alkaline material contacting the vegetable brine in the container after sterilization to either buffer or reduce the acidity of the packed product during sterilization and subsequent storage so that the pH of the brine during storage is maintained at a pH of between about 7.6 to 8.5 and preferably 7.9–8.1. It has been determined that if the pH of the brine of the stored sterilized canned vegetable product is in excess of 8.5, off-flavors will develop. If the pH of the brine during storage falls below 7.6, unacceptable discoloration of the canned green vegetable product occurs.

The green vegetables, sterilized under HTST conditions and in which the sterilized brine has a pH of 7.6–8.5 packed in cans interiorly coated with the alkaline earth metal material containing enamel can be stored for at least eight months, as will hereinafter be disclosed, without noticeable change of the color or flavor of the vegetables.

The alkaline earth metal materials which may be incorporated in the can enamel include the alkaline earth metals and salts of these metals such as calcium, calcium hydroxide, calcium carbonate, calcium oxide, magnesium, magnesium hydroxide, magnesium carbonate and magnesium oxide.

The alkaline earth metal material can be ground or otherwise dispersed into the organic enamel and normal grinding equipment used for other coating additives such as ZnO is excellently adapted for this purpose. In the coating, drying and baking operations which the alkaline earth metal modified enamel coating undergoes in its application to the interior container walls, the alkaline earth metal material appears to migrate and becomes seated close to the brine contacting surface of the applied coating so that the alkaline earth metal material becomes available to buffer and/or reduce the acidity rise in the sterilized container contents resulting from the oxidation or hydrolytic deterioration of the canned vegetable product during storage.

To control the rise in acidity which occurs during the HTST sterilization of the canned vegetable product and thereby maintain the color of the vegetables during such processing, an amount of an alkaline chemical additive approved by the U.S. Federal Drug Administration (FDA), such as CaO or Ca(OH)$_2$, is incorporated in the vegetable brine prior to sterilization to provide an alkalinity level in the brine of between about 25 and 75 milliequivalents of hydroxyl ion and preferably between about 40 and 60 milliequivalents of hydroxyl ion in the brine. At such alkalinity levels the brine pH of the vegetable product sterilized under HTST conditions will generally range from 7.6 to 8.5. Generally the amount of CaO or Ca(OH)$_2$ added to the brine should not exceed that amount which will raise the calcium ion concentration of the packaged vegetable product above 350 ppm. For peas, the amount of CaO or Ca(OH)$_2$ added to the brine is that amount which will provide a maximum of 1050 ppm calcium ion in the brine, or about 0.1% by weight calcium salt based on the weight of the brine, the brine constituting about ⅓ the weight of the packaged product.

To provide the interior of the container with the coating composition of the present invention, the enamel composition having the alkaline earth metal material incorporated therein is applied to some interior surface of the container; preferably an end. The composition can be applied as the base coating or as an overcoat or topcoat of any desired design such as a spot on the body side walls or end, preferably in the center of the latter; or as an annular ring on or adjacent to the countersink wall of the end.

The amount of enamel material containing the alkaline earth metal material which is applied to the container is applied at a level so that at least between about 1 to 20 or more milligrams (mgs.) of alkaline earth metal per square inch (sq.in.) of container surface is applied to the interior surface of the container. In general, amounts of alkaline earth metal in excess of 10 mg. per sq.in. tend to be wasteful of material, but such amounts may be used if desired. An alkaline earth metal application rate of less than 1 mg. of alkaline earth metal per sq. in. of container surface will not ordinarily serve to prevent discoloration during long term storage of the vegetable packaged in the container. From 2 mgs. to 10 mgs. of alkaline earth metal material per sq.in. of container surface is usually satisfactory for the coating of an ordinary 303/406 (3 3/16 inch diameter, 4 6/16 inch height) food can (about 16 ounce size).

To achieve this level of alkaline earth metal material on the container wall surface the alkaline earth metal materials may be incorporated in a conventional lacquer or enamel coating which is used for the coating of the can or end stock in an amount ranging from about 20% to about 60% by weight of the lacquer and preferably 30 to 50% by weight. Larger amounts tend to be wasteful of material and tend to degrade the quality of the coating.

To prepare coating formulations for use in accordance with the practice of the present invention, the alkaline earth metal material in finely divided particle form, e.g., 50 to 400 mesh, is merely suspended at room temperature in a solvent dispersion of the conventional lacquer.

As is known, conventional container enamels for the foodstuff industry utilize as resin vehicles such natural and synthetic resins as alkyd resins, rosin, maleic acid modified resin, phenolic resins such as phenol/formaldehyde resins, alkyd-amino combinations, epoxy resins, acrylic resins and polyamide resins. Dehydrated castor oil, linseed oil and other conjugated oils are effectively used in combination with the natural and synthetic resins as coating vehicles. Also added to these vehicles are driers such as cobalt and maganese napthenthanate in small concentrations, e.g., 0.001% to 0.005% by weight, as well as pigments and fillers such as aluminum, mica and graphite in finely powdered form. Zinc oxide in relatively large concentrations, e.g., 10% to 15% by weight, is incorporated in the enamel to improve the stain resistance of the enamel to the sulfur bearing vegetables.

Green vegetables which are to be canned according to the present invention are treated in a conventional blancher with hot water. The raw devined peas are blanched in hot water for the minimum time necessary to expel occluded gases and extraneous dirt and other adhering materials. The temperature of the blanch is preferably between 180°–190° F. and the duration of the blanch is for a suitable lapse of time, this time element varying somewhat with the character of the vegetable being canned. Two to five minutes at 180° F. is a suitable time in the canning of green peas.

To further control the rise in acidity which occurs during the sterilization step of the present process, the alkalinity of the blanch solution is adjusted to have a pH of at least 11. This pH level can be achieved by incorporating in the blanch solution an alkaline reagent such as an alkaline earth or alkali metal oxide or hydroxide or carbonate such as $Mg(OH)_2$, $Ca(OH)_2$, NaOH, CaO, $Na_2CO_3$ and $NaHCO_3$. The addition of 75-125 ppm NaOH or 750-1250 ppm $Ca(OH)_2$ to the blanch solution will generally adjust the pH of the solution to a pH of 11 or more. The adjustment of the pH level of the blanch solution to 11 or more has been found to be a critical feature of the invention. If a highly alkaline blanch solution is not used in the present process, the pH of the brine will, after sterilization, drop to levels, e.g., pH 7.5-7.6, at which discoloration will occur. When a blanch solution having a pH of at least 11 is used, the pH of the brine will remain at levels, e.g., 8.4, at which vegetable discoloration is avoided. By maintaining the pH of the blanch solution at high pH values, for example 11-12, the acid content of the blanched peas will be reduced and thereby the reduction in the pH of the brine after sterilization will be minimized because of the pretreatment of the vegetables with the highly alkaline blanch solution.

The vegetable product after blanching is drained so as to be substantially free from adhering water and filled into cans by the use of conventional type of canning equipment.

A brine solution containing the proper concentrations of salt, sugar and CaO or $Ca(OH)_2$ for alkalinity adjustment is added and the cans are then hermetically sealed in the usual manner. The sealed cans are placed in a retort and subjected to HTST sterilization conditions such as 7.5 minutes at 257° F. A rapid come-up time in the retort, e.g., 3-5 minutes, is desirable and a rapid (1-2 minutes) and thorough cooling (for example down to 80° F.) is essential after processing. It is preferred that during the HTST sterilization the canned product be agitated and/or rotated to effect uniform heat distribution through the canned contents. Agitating type retorts are commercially available and are preferred for use in accomplishing the HTST sterilization. An example of such a commercially available agitating type retort is one sold under the tradename Sterilmatic by the FMC Corporation.

The use of HTST sterilization conditions of 5-10 minutes at 255°-300° F. rather than the bacteriologically equivalent 15-30 minutes at 250° F. is critical to achieving color and flavor stability in accordance with the practice of the present invention when the alkalinity of the brine is adjusted to an alkalinity of between 25 and 75 milliequivalents of hydroxyl ion. There is a distinctive improvement in flavor and color over the usual canned peas and this is ascribed to the combination of processing conditions using containers which are internally coated with alkaline compound filled coatings, using a blanch solution having an alkaline pH of at least 11, using a brine having an alkalinity adjusted to between 25 and 75 milliequivalents of hydroxyl ion and sterilizing the canned peas at HTST sterilizing conditions of 5-10 minutes at 255°-300° F. to provide an $F_o$ value of at least 6 and a brine pH in the sterilized product of between about 7.6 and 8.5.

The invention and advantages thereof will be readily understood from the following specific Example of an illustrative embodiment of the invention. In the Example, the term parts refers to parts by weight unless otherwise specifically indicated.

EXAMPLE

Tin-free steel can stock was coated with a conventional food can enamel having the following solids content: 85% by weight of a vehicle composed of 45.29 parts maleic acid modified rosin, 54.35 parts dehydrated castor oil, 0.35 parts manganese napthenate dryer and 15% by weight zinc oxide. The coating solids were dispersed in mineral spirits which constituted 40% by weight of the total coating formulation. The enamel was then applied to tin-free steel can stock by means of rollers and the coated can stock was baked at 415° F. for a period of 8 minutes. Can bodies (303/406) were then fabricated from the enamel coated can stock. The cans were washed and sterilized with a mixture of boiling water and steam prior to filling.

Can ends fabricated to seal the cans were prepared from tin free steel can stock which had been coated with the enamel used to prepare the can bodies but in which enamel was suspended 50% by weight of magnesium oxide having a particle size of 325 mesh to provide 8 mgs. MgO per square inch of can surface.

Freshly harvested young peas were vined, cleaned and sieve sized as in conventional practice. The peas were put through a continuous blancher containing a water solution containing 1000 ppm calcium hydroxide. The pH of the blanch solution was 12. The peas were subjected to this blanching solution at a temperature of about 190° F. for about 2 minutes. The peas were cooled with water, gravity separated, sorted and packed into the enamel coated cans together with a preheated (180° F.) brine composed of 1% NaCl, 2% sugar and 1050 ppm $Ca(OH)_2$. The brine had an alkalinity of 52 milliequivalents of hydroxyl ion. The filled cans were sealed using the ends having food contacting surfaces coated with the MgO modified enamel.

The closed cans were sterilized in a Sterilmatic cooker for 7.5 minutes at 257° F. to an $F_o$ value of 8. The cans were pressure cooled with water at 85° F. The pH of the brine in the steriized product was found to be 8.4.

After the cans were processed in this manner the cans were opened and the contents of the opened cans evaluated for color and flavor by a consumer preference panel consisting of 200 people. The chlorophyll, pheophytin and pyrole contents of the peas were analytically determined by photospectroscopic analysis which indicates the relative content of these compositions in the peas. A high chlorophyll content means that little discoloration of the peas has occurred. Pheophytin amd pyrole are degradation products of chlorophyll. A relatively low pheophytin and pyrole content means little degradation of the chlorophyll content of the peas had occurred.

The results of the consumer panel evaluation are summarized in the Table below.

As a first control (designated "$C_1$"), the process of the Example was repeated with the exception that the canned peas were sterilized using conventional sterilization conditions at 250° F. for 25 minutes.

As a second control (designated "$C_2$"), cans, similar to those used in the Example except that the ends were coated with conventional enamel (i.e., no MgO present), were sterilized, packed with blanched peas and sterilized using conventional sterilization conditions at 250° F. for 25 minutes. These control cans were also opened after processing and the contents of the opened cans evaluated for taste and color. The results of this second series of control tests are also recorded in the Table below.

TABLE I

| Summary of Comments of Consumer Preference Panel Evaluation of Sterilized Canned Peas: | | |
|---|---|---|
| | PEA CHARACTERISTIC | |
| Run No. | Appearance | Flavor |
| Example | Bright green | Fresh-like |
| $C_1$ | Dark Green | Can-like |
| $C_2$ | Light Brown | Can-like |

Photospectroscopic analysis of the peas indicated that the amount of chlorophyll present in the peas processed in accordance with the procedure of $C_2$ was about 2% of that present in either the peas processed in accordance with the procedure of the Example or $C_1$. The amount of pheophytin present in the peas processed in accordance with the procedure of the Example or $C_1$ was about 10% of that in peas processed in accordance with the procedure of $C_2$. The amount of pyrole present in the peas processed in accordance with the procedure of the Example was about 10% of that in the peas processed in accordance with the procedure of $C_1$ or $C_2$.

Cans processed in the manner of the Example were opened after 8 months storage at ambient temperature. Examination of the peas in the cans indicated that they were still green and no off-flavor or unusual odors could be detected.

By way of contrast, examination of the contents of cans processed in the manner of $C_1$ when opened after 7 months storage at ambient temperature indicated that the peas packaged therein were still green but had developed an off taste.

By way of further contrast, examination of contents of cans processed in the manner of $C_2$ when opened after 7 months storage at ambient temperature indicated that the peas packaged therein were discolored, had a khaki color and had developed an off-taste.

As a third control, the procedure of the Example was repeated with the exception that $Ca(OH)_2$ was not incorporated in the blanch solution. These control cans were opened after sterilization and examination of the contents indicated the peas were pale green in appearance and the brine pH was 7.6.

What is claimed is:

1. A method of canning green vegetables which normally tend to discolor and develop off-flavors during canning and storage which comprises blanching the vegetables with an alkaline solution having a pH of at least 11, suspending the blanched vegetables in a brine having an alkalinity between about 25 and 75 milliequivalents of hydroxyl ion, hermetically sealing the vegetables in a container in which at least one of the walls thereof in contact with the brine has had applied thereto a water insoluble organic coating material having incorporated therein zinc oxide and an alkaline earth metal material selected from the group consisting of an alkaline earth metal salt, and alkaline earth metal oxide and an alkaline earth metal hydroxide, said coating containing sufficient alkaline earth material so that there is sufficient alkaline earth material contacting the vegetable brine in the container after sterilization to either buffer or reduce the acidity of the packed product during sterilization and subsequent storage so that the pH of the brine during storage is maintained so that discoloration and off-flavor of the green vegetable is prevented and then heating the container at a temperature of about 250° to 300° F. to sterilize the vegetables packaged in the container to an $F_o$ value of at least 6.

2. The method of claim 1 wherein the alkalinity of the brine in which the vegetables are suspended is adjusted to between about 40 to about 60 milliequivalents of hydroxyl ion.

3. The method of claim 1 wherein the alkaline earth metal material is incorporated in the coating at a concentration in the range of about 20 to about 80% by weight of the coating.

4. The method in claim 1 wherein the alkaline earth metal material is present on the interior container walls at a concentration in the range of about 2 to about 10 milligrams per square inch of container wall surface.

5. The method of claim 1 wherein the material is magnesium oxide.

6. The method of claim 1 wherein the vegetable is green peas.

7. The method of claim 6 wherein the container is heated at HTST sterilizing conditions of about 5 to 10 minutes at about 255° to about 300° F.

8. The method of claim 1 wherein the alkalinity of the brine in which the vegetables are suspended prior to sterilization is adjusted with CaO or Ca(OH)$_2$.

9. The method of claim 1 wherein the vegetables are blanched at a temperature of about 180° to about 190° F. prior to their suspension in the brine.

10. The method of claim 1 wherein the pH of the sterilized brine is between about 7.6 and 8.5.

11. The method of claim 1 wherein the pH of the sterilized brine is between 7.9 and 8.1.

12. The method of claim 1 wherein the alkalinity of the solution used for the blanch is adjusted with an alkaline reagent selected from the group consisting of an alkaline earth oxide, an alkaline earth metal hydroxide, an alkali metal oxide, and alkali metal hydroxide and an alkali metal carbonate.

13. The method of claim 1 wherein 10 to 15% by weight ZnO is incorporated in the organic coating material.

* * * * *